(12) United States Patent
Mochihara

(10) Patent No.: US 7,955,212 B2
(45) Date of Patent: Jun. 7, 2011

(54) DAMPER DEVICE

(75) Inventor: Takahiro Mochihara, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 411 days.

(21) Appl. No.: 12/324,954

(22) Filed: Nov. 28, 2008

(65) Prior Publication Data

US 2009/0139811 A1  Jun. 4, 2009

(30) Foreign Application Priority Data

Nov. 30, 2007 (JP) ................. 2007-310936

(51) Int. Cl.
*F16H 48/06* (2006.01)
*F16F 15/12* (2006.01)

(52) U.S. Cl. ............... 475/230; 74/572.2; 74/574.4

(58) Field of Classification Search ............ 74/572.2, 74/574.4; 475/220, 230
See application file for complete search history.

(56) References Cited

U.S. PATENT DOCUMENTS

| | | | |
|---|---|---|---|
| 4,318,309 A * | 3/1982 | Bremer, Jr. ............... | 74/574.4 |
| 5,562,544 A * | 10/1996 | Ochs et al. ............... | 464/89 |

FOREIGN PATENT DOCUMENTS

| | | |
|---|---|---|
| JP | 60-43749 | 3/1985 |
| JP | 61-109941 | 7/1986 |
| JP | 62-200033 | 12/1987 |
| JP | 2-72835 | 6/1990 |
| JP | 6-69486 | 9/1994 |
| JP | 2002-168294 | 6/2002 |

* cited by examiner

*Primary Examiner* — David D Le
*Assistant Examiner* — Derek D Knight
(74) *Attorney, Agent, or Firm* — Oblon, Spivak, McClelland, Maier & Neustadt, L.L.P.

(57) ABSTRACT

Mass portions of torsional dampers are annular surrounding corresponding elastic portions. The mass portion of the torsional damper has a first inclined face formed such that the elastic portion deforms in a sheared manner as the mass portion rotates in a rotational direction with respect to a companion flange and the elastic portion partially deforms in a compressed manner as the mass portion rotates in a direction other than the rotational direction. The mass portion of the torsional damper has second inclined faces formed such that the elastic portion deforms in a sheared manner as the mass portion rotates in the direction of the rotational axis of the companion flange and the elastic portion partially deforms in a compressed manner as the mass portion rotates in a direction other than the direction of the rotational axis.

13 Claims, 12 Drawing Sheets

DAMPER DEVICE

INCORPORATION BY REFERENCE

The disclosure of Japanese Patent Application No. 2007-310936 on Nov. 30, 2007 including the specification, drawings and abstract is incorporated herein by reference in its entirety.

BACKGROUND OF THE INVENTION

1. Field of the Invention

The invention relates to a damper device having a mass portion and an elastic portion, in particular, relates to a damper device incorporating a plurality of torsional dampers having different characteristics and together supported on a rotational element.

2. Description of the Related Art

One of damper devices that damp vibrations through dynamic vibration absorption at resonance frequencies is a torsional damper that damps torsional vibrations using mass portions and elastic portions, and this torsional damper is, for example, provided at the rotation input portion of a drive-force transfer unit, such as a differential unit for vehicles.

As one of damper devices of the kind described above, Japanese Utility Model Application Publication No. 61-109941 (JP-U-61-109941) describes a disk-shaped torsional damper that is constituted of two annular mass portions having different radiuses and arranged concentrically and two annular elastic portions having different radiuses and arranged between the two mass portions and between one of the two mass portions and a shaft portion, respectively. This torsional damper provides two characteristic vibrations through coupled vibrations of the two annular inertia portions each constituted of one mass portion and one elastic portion.

Further, Japanese Utility Model Application Publication No. 2-72835 (JP-U-2-72835) describes a damper device that has a double-layered damper structure constituted of a first vibration ring that is supported on the outer peripheral side of a hub via a first elastomer ring, a pulley that is provided on the outer side of the first vibration ring so as to provide an inertia mass required for vibration damping, and a second vibration ring that is disposed, via a second elastomer ring, in the inner space of the damper device.

Further, Japanese Utility Model Application Publication No. 6-69486 (JP-U-6-69486) describes a damper device in which first and second mass portions each tapered at the inner peripheral side thereof are attached, via tapered elastic portions, on tapered slide hubs that are opposed to each other. According to this damper device, the natural frequency of the damper device is adjusted as needed by changing the compression amounts of the elastic portions by moving the slide hubs relative to each other in the axial direction.

Further, Japanese Utility Model Application Publication No. 62-200033 (JP-U-62-200033) describes a differential unit for vehicles. According to this publication, based on the fact that the torsional vibration frequency that causes meshing noises at the final reduction gear is different between when the vehicle is being accelerated and when the vehicle is being decelerated, two torsional dampers having different resonance frequencies are concentrically arranged on the outer peripheral face of a flange provided at the input portion of the differential unit.

According to the technologies described in the above publications, however, it is still difficult to provide a compact damper device that provides desired vibration-damping effects for multiple target resonances having resonance frequencies largely different from each other.

For example, among various noises and vibrations that occur in a rear-drive vehicle, thrumming noises that are caused by resonances at the rotation input portion of a rear-differential unit and can be heard in the vehicle compartment are very difficult to suppress. The forces that cause such resonances at the rotation input portion of the rear differential unit (i.e., the mesh-point dynamic rigidity that represents the ratio of the amplitude of the cyclical response displacement of the rotation input portion of the rear differential unit to the amplitude of the vibration at the mesh point at the final reduction gear) can be suppressed by providing a related-art torsional damper at a flange of the rotation input portion of the rear differential unit. However, in order to suppress the aforementioned thrumming noises reliably, it is also necessary to suppress bending resonances at the rotation input portion of the rear differential unit.

However, usually, there is a large difference (e.g., a difference of several hundreds hertz) between the resonance frequency of a damper device that is required to provide a sufficient vibration-damping effect for torsional resonances and the resonance frequency of the damper device that is required to provide a sufficient vibration-damping effect for longitudinal prying resonances. According to related-art technologies, therefore, it is still difficult to provide a damper device that provides desired vibration-damping effects for two target resonances largely different in frequency but is compact enough to be fit in a limited space at the input portion of a differential unit.

SUMMARY OF THE INVENTION

The invention provides a compact damper device that provides desired vibration-damping effects for multiple resonances largely different in frequency, and the invention further provides a drive-force transfer unit that incorporates the damper device to reduce vibration noises.

The first aspect of the invention relates to a damper device having: a first torsional damper that has a mass portion and an elastic portion attached on the mass portion; and a second torsional damper that has a mass portion and an elastic portion attached on the mass portion and has a characteristic different from a characteristic of the first torsional damper. The first torsional damper and the second torsional damper are provided on a rotational element that rotates about a rotational axis. The mass portion of the first torsional damper is annular and surrounds the elastic portion of the first torsional damper, and the mass portion of the second torsional damper is annular and surrounds the elastic portion of the second torsional damper. The mass portion of the first torsional damper has a first inclined face that extends along the circumference of the mass portion of the first torsional damper such that the elastic portion of the first torsional damper deforms in a sheared manner as the mass portion of the first torsional damper moves, with respect to the rotational element, in a rotational direction about the rotation axis of the rotational element and such the elastic portion of the first torsional damper partially deforms in a compressed manner as the mass portion of first torsional damper moves, with respect to the rotational element, in a direction other than the rotational direction. The mass portion of the second torsional damper has a plurality of second inclined faces that extend in an axial direction of the rotational element and are spaced apart from each other along the circumference of the mass portion of the second torsional damper such that the elastic portion of the second torsional damper deforms in a sheared manner as the mass portion of the second torsional damper moves, with respect to the rotational element, in the direction of the rotational axis of the rotational element and such that the elastic portion of the second torsional damper partially deforms in a compressed manner as the mass portion of the second torsional damper moves, with respect to the rotational element, in a direction other than the direction of the rotational axis of the rotational element. At least one of the first torsional damper, the second torsional damper, and the rotational element has a first opposite face that is opposed to the first inclined face of the mass portion of the first torsional damper, and at least one of the first torsional damper, the second torsional damper, and the rotational element has second opposite faces that are opposed to the respective second inclined faces of the mass portion of the second torsional damper.

According to the damper device described above, in the first torsional damper constituted of the mass portion with the first inclined face and the elastic portion attached on said mass portion, the elastic portion deforms in a sheared manner under vibrations in the torsional directions and the elastic portion deforms in a compressed manner under vibrations in the longitudinal prying directions, or the like. Therefore, the longitudinal prying resonance frequency, or the like, of the first torsional damper can be adjusted as needed, while maintaining its torsional resonance frequency at a desired value, by setting the inclination angle of the first inclined face of the mass portion and the number of such inclined faces appropriately. On the other hand, in the second torsional damper constituted of the mass portion with the second inclined faces and the elastic portion attached on said mass portion, the elastic portion deforms in a sheared manner under vibrations in the direction of the rotational axis of the rotational element, vibrations in the longitudinal prying directions, and the like, and the elastic portion deforms in a compressed manner under vibrations in the torsional directions. Therefore, the torsional resonance frequency of the second torsional damper can be adjusted as needed, while maintaining its longitudinal prying resonance frequency, or the like, at a desired value, by setting the inclination angles of the respective second inclined faces of the mass portion and the number of the second inclined faces appropriately. Thus, using these torsional dampers, it is possible to provide a contact damper that provides desired vibration-damping effects for resonances largely different in frequency.

The above-described damper device may be such that: the first torsional damper and the second torsional damper are stacked in a radial direction of the rotational element such that the first torsional damper is provided on the inner side of the second torsional damper; and the first inclined face is provided at an inner peripheral face of the mass portion of the first torsional damper and the second opposite faces are provided at an outer peripheral face of the mass portion of the first torsional damper so as to be opposed to the respective second inclined faces of the mass portion of the second torsional damper, or may be such that: the first torsional damper and the second torsional damper are stacked in a radial direction of the rotational element such that the second torsional damper is provided on the inner side of the first torsional damper; and the second inclined faces are provided at an inner peripheral face of the mass portion of the second torsional damper and the first opposite face is provided at an outer peripheral face of the mass portion of the second torsional damper so as to be opposed to the first inclined face of the mass portion of the first torsional damper.

In either of these two structures, because the torsional dampers are stacked in the radial direction of the rotational element, the damper device can be made a compact damper device that is short in the axial direction.

Further, the above-described damper device may be such that: the first torsional damper and the second torsional damper are arranged in parallel so as to be adjacent to each other in the direction of the rotational axis of the rotational element; and the first opposite face and the second opposite face are formed at the rotational element.

According to this structure, because the torsional dampers are arranged adjacent to each other in the direction of the rotational axis of the rotational element, the damper device can be made a compact damper device having a small radius.

Further, the above-described damper device may be such that: the mass portion of the first torsional damper has a first convex portion protruding from the mass portion of the first torsional damper in a radial direction of the mass portion of the first torsional damper and extending along the circumference of the mass portion of the first torsional damper, and the first inclined face is formed by the first convex portion; the mass portion of the second torsional damper has second convex portions spaced apart from each other along the circumference of the mass portion of the second torsional damper, protruding from the mass portion of the second torsional damper in a radial direction of the mass portion of the second torsional damper, and extending in the axial direction of the rotational element, and the second inclined faces are formed by the second convex portions; the first opposite face is formed by a first opposite concave portion that is concaved so as to match the shape of the first convex portion; and the second opposite faces are formed by second opposite concave portions that are concaved so as to match the shapes of the respective second convex portions.

According to this structure, because the elastic portion of the first torsional damper is arranged between the first convex portion extending along the circumference of the first torsional damper and the first opposite concave portion that is opposed to the first convex portion, the rigidity of the elastic portion against vibrations in the axial direction, prying forces in the longitudinal direction, and the like, can be set to a proper value within a wide range by setting the number of the first convex portion and the first opposite concave portion, the inclination angle of the first inclined face, and so on, appropriately. As such, the longitudinal prying resonance frequency, or the like, of the first torsional damper can be properly adjusted to a target value, while maintaining its torsional resonance frequency at a desired value, even if said target value is largely different from the torsional resonance frequency of the first torsional damper. According to the above-described structure, further, because the elastic portion of the second torsional damper is arranged between the second convex portions spaced apart from each other along the circumference of the second torsional damper and extending in the axial direction of the rotational element and the second opposite concave portions that are opposed to the respective second convex portions, the rigidity of the elastic portion against vibration forces in the rotational directions can be set to a proper value within a wide range by setting the number of the second convex portions and the second opposite concave portions, the inclination angles of the respective second inclined faces, and so on, appropriately. As such, the torsional resonance frequency of the second torsional damper can be properly adjusted to a target value, while maintaining its longitudinal prying resonance frequency, or the like, at a desired value, even if said target value is largely different from the longitudinal prying resonance frequency, or the like, of the second torsional damper.

Further, the above-described damper device may be such that: the mass portion of the first torsional damper has a first concave portion concaved in a radial direction of the mass portion of the first torsional damper and extending along the circumference of the mass portion of the first torsional damper, and the first inclined face is formed by the first concave portion; the mass portion of the second torsional damper has second concave portions spaced apart from each other along the circumference of the mass portion of the second torsional damper, concaved in a radial direction of the mass portion of the second torsional damper, and extending in the axial direction of the rotational element, and the second inclined faces are formed by the second concave portions; the first opposite face is formed by a first opposite convex portion that is convexed so as to match the shape of the first concave portion; and the second opposite faces are formed by second opposite convex portions that are convexed so as to match the shapes of the respective second concave portions.

According to this structure, because the elastic portion of the first torsional damper is arranged between the first concave portion extending along the circumference of the first torsional damper and the first opposite convex portion that is opposed to the first concave portion, the rigidity of the elastic portion against prying forces in the longitudinal direction, and the like, can be set to a proper value within a wide range by setting the number of the first concave portion and the first opposite convex portion, the inclination angle of the first inclined face, and so on, appropriately. As such, the longitudinal prying resonance frequency, or the like, of the first torsional damper can be properly adjusted to a target value, while maintaining its torsional resonance frequency at a desired value, even if said target value is largely different from the torsional resonance frequency of the first torsional damper. According to the above-described structure, further, because the elastic portion of the second torsional damper is arranged between the second concave portions spaced apart from each other along the circumference of the second torsional damper and extending in the axial direction of the rotational element and the second opposite convex portions that are opposed to the respective second concave portions, the rigidity of the elastic portion against vibration forces in the rotational directions can be set to a proper value within a wide range by setting the number of the second concave portions and the second opposite convex portions, the inclination angles of the respective second inclined faces, and so on, appropriately. As such, the torsional resonance frequency of the second torsional damper can be properly adjusted to a target value, while maintaining its longitudinal prying resonance frequency, or the like, at a desired value, even if said target value is largely different from the longitudinal prying resonance frequency, or the like, of the second torsional damper.

The second aspect of the invention relate to a drive-force transfer unit, having: the above-described damper device; a case; a drive-side gear shaft that is rotatably supported by the case and inputs rotational drive force; a driven-side gear shaft that is disposed in the case, is in mesh with the drive-side gear shaft, and rotates at a reduced speed; an output shaft that is turned by the driven-side gear shaft; and the rotational element that is provided at an end of an input shaft of the drive-side gear shaft.

Having this structure, the drive-force transfer unit provides, using the damper device, desired vibration-damping effects for multiple resonances largely different in frequency, such as resonances caused by the force applied from the mesh point with the drive-side gear shaft that inputs rotational drive force, resonances caused by longitudinal prying vibrations accompanying the bending of the drive-side gear shaft, and so on.

The above-described drive-force transfer unit may be such that; a resonance frequency of the first torsional damper is set to a value close to a torsional resonance frequency of the drive-side gear shaft; and a resonance frequency of the second torsional damper is set to a value close to a bending resonance frequency of the drive-side gear shaft.

The peak of the vibration that is caused on a case close to the end of the input shaft of the drive-side gear shaft due to the force applied from the mesh point between the drive-side gear shaft and the driven-side gear shaft is determined by the torsional resonance frequency of the drive-side gear shaft. According to the structure described above, therefore, the peak of said vibration can be suppressed by setting the torsional resonance frequency of the torsional damper having the first characteristic to a value close to the torsional resonance frequency of the drive-side gear shaft. On the other hand, the vibration peak of the drive-side gear shaft, which is determined by the vibration sensitivity of the case close to the input shaft of the drive-side gear shaft, can be suppressed by setting the resonance frequency of the torsional damper having the second characteristic to a value close to the bending resonance frequency of the input shaft of the drive-side gear shaft.

According to the invention, as described above, the longitudinal prying resonance frequency, or the like, of the first torsional damper that is constituted of the mass portion having the first inclined face extending along the circumference of the mass portion and the elastic portion attached on the mass portion can be adjusted as needed while maintaining its torsional resonance frequency at a desired value, and the torsional resonance frequency of the second torsional damper that is constituted of the mass portion having the second inclined faces extending in the axial direction of the rotational element and the elastic portion attached on the mass portion can be adjusted as needed while maintaining its longitudinal prying resonance frequency, or the like, at a desired value. Incorporating these torsional dampers, the damper device can be made a compact damper device that provides desired vibration-damping effects for multiple target resonances largely different in frequency.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein.

DETAILED DESCRIPTION OF THE EMBODIMENTS

Hereinafter, example embodiments of the invention will be described with reference to the accompanying drawings.

First Example Embodiment

Figure 1:
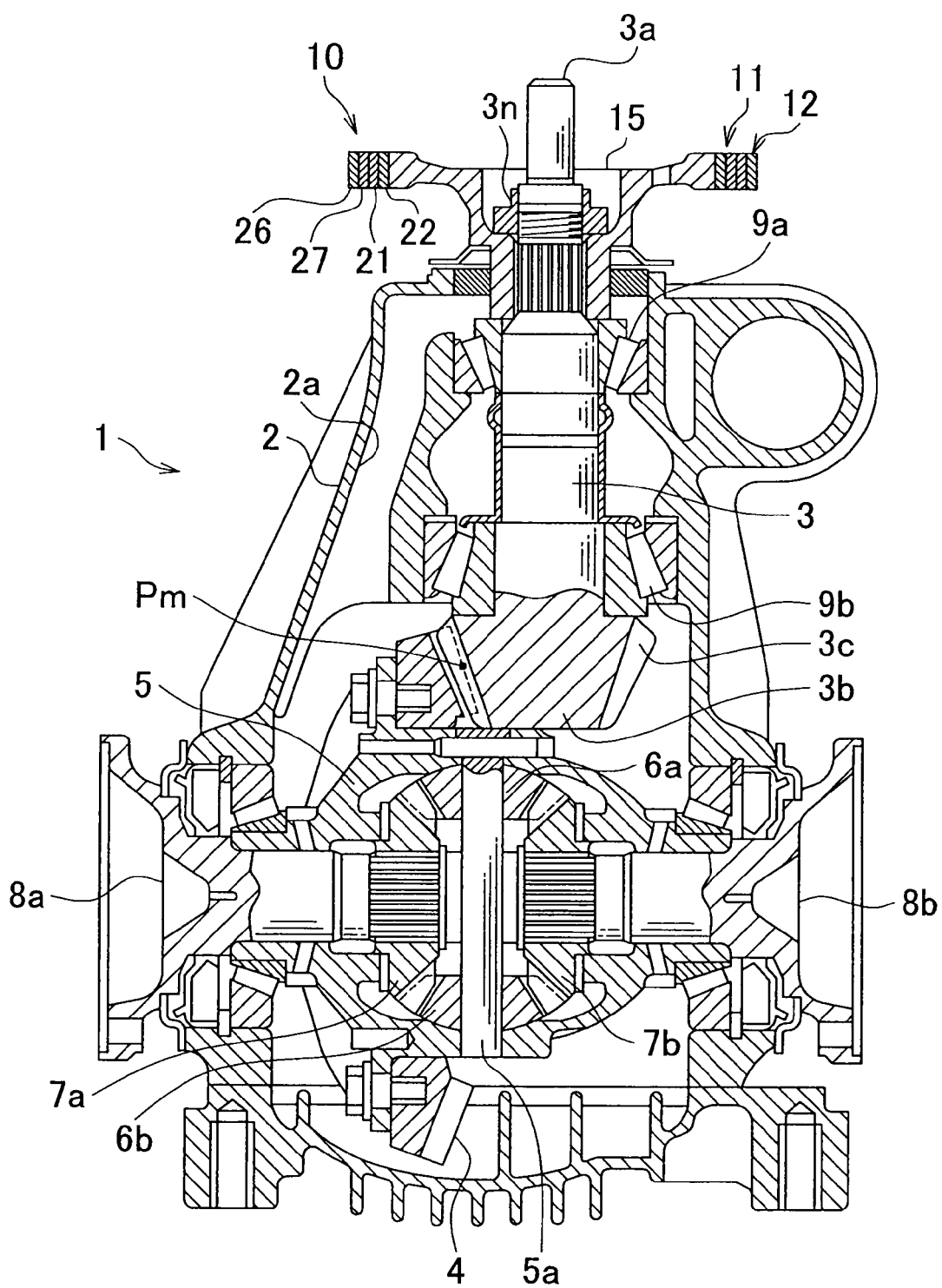
FIG. 1 is a cross-sectional side view of a drive-force transfer unit incorporating a damper device according to the first example embodiment of the invention.
Figure 2:
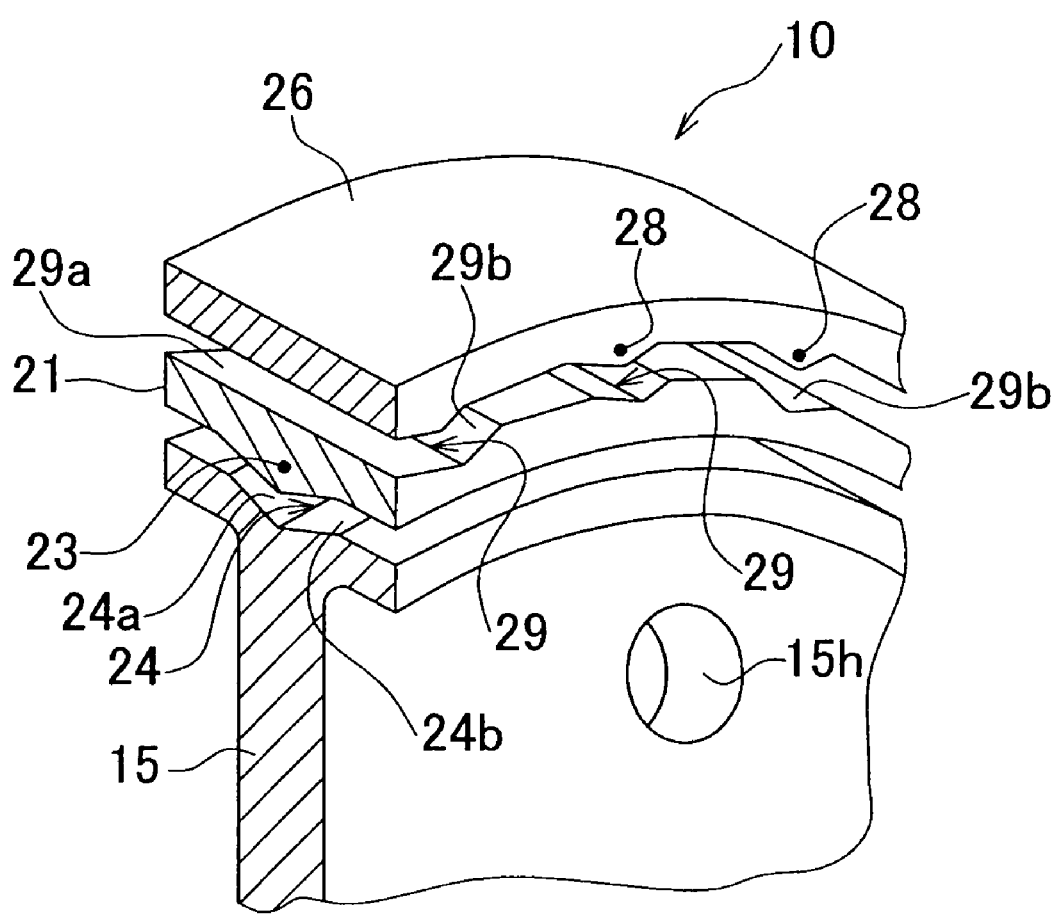
FIG. 2 is a cross-sectional perspective view of a portion of the damper device of the first example embodiment of the invention.
Figure 3:
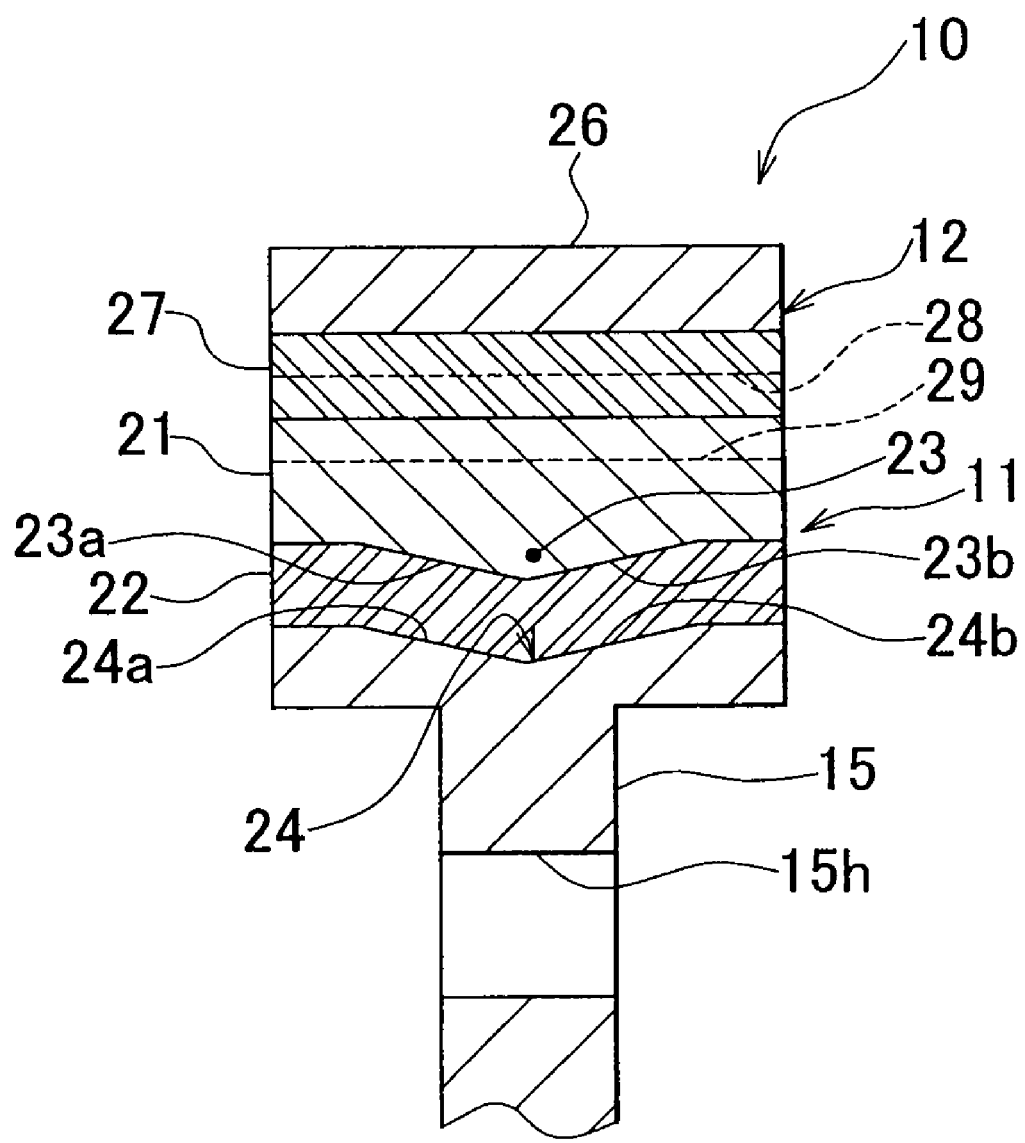
FIG. 3 is an enlarged cross-sectional side view of a portion of the damper device of the first example embodiment of the invention.
Figure 4:
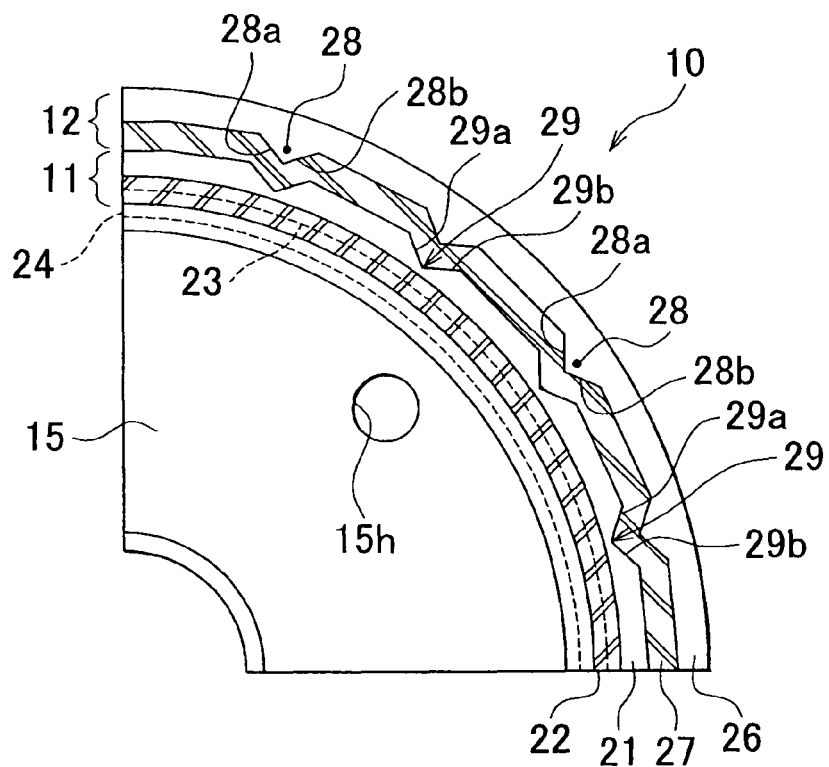
FIG. 4 is an enlarged front view of a portion of the damper device of the first example embodiment of the invention.

FIG. 1 is a cross-sectional side view of a drive-force transfer unit incorporating a damper device 10 according to the first example embodiment of the invention. FIG. 2 is a cross-sectional perspective view of a portion of the damper device 10. FIG. 3 is an enlarged cross-sectional side view of a portion of the damper device 10. FIG. 4 is an enlarged front view of a portion of the damper device 10. The damper device 10 is incorporated in a rear differential unit mounted in a rear-drive vehicle.

First, the structure of the damper device 10 will be described.

Referring to FIG. 1, the damper device 10 has torsional dampers 11, 12 having different characteristics. The torsional dampers 11, 12 are stacked on top of each other in a radial direction of the damper device 10. The torsional dampers 11, 12 are concentrically supported on a companion flange 15 that is a rotational element and rotates about the center axis of the damper device 10.

The companion flange 15 is secured to a rotation input portion of a rear differential unit 1 of a rear-drive vehicle, which will be described in detail later. The companion flange 15 is coupled with a flexible joint or a companion shaft on the propeller shaft side by bolts tightened to bolt holes 15*h*. That is, the companion flange 15 rotates as rotational force is input to the companion flange 15 from the propeller shaft.

The rear differential unit 1 has: a differential carrier case 2 ("case" cited in the claims), a drive pinion 3 ("drive-side gear shaft") that has an outer end portion 3*a* ("input-shaft end portion") protruding from the front end of the differential carrier case 2 toward the front side of the vehicle and an inner end portion 3*b* at which a bevel gear 3*c* is provided; a ring gear 4 that is a bevel gear having a large diameter and meshing with the bevel gear 3*c* of the drive pinions 3; a differential housing 5 that is cylindrical, is integrally coupled with the ring gear 4, and is arranged such that its axis extends in the lateral direction of the vehicle; pinions 6*a*, 6*b* that are rotatably supported on a shaft 5*a* supported at the center of the differential housing 5; left and right side gears 7*a*, 7*b* that are in mesh with the pinions 6*a*, 6*b*, respectively; and left and right axles 8*a*, 8*b* that are coupled with the side gears 7*a*, 7*b*. The drive pinion 3 is rotatably supported by the differential carrier case 2 via two pairs of rollers 9*a*, 9*b*, and rotational force is input to the drive pinion 3 from the propeller shaft, which is not shown in the drawings.

The ring gear 4 and the differential housing 5 are disposed in the differential carrier case 2 and together serve as a driven-side gear shaft meshing with the drive pinion 3 and rotated at a reduced speed. The differential housing 5 rotates as the ring gear 4 rotates at a reduced speed. At this time, the pinions 6*a*, 6*b* and the side gears 7*a*, 7*b* rotate together with the shaft 5*a*, whereby rotational drive force is transmitted to the left and right axles 8*a*, 8*b* ("output shaft"). Further, because the two pinions 6*a*, 6*b* are rotatable relative to the shaft 5*a*, the side gears 7*a*, 7*b* are rotatable relative to each other, which enables various differential motions when the vehicle is turning. The rollers 9*a*, 9*b* are spaced a predetermined distance from each other such that their small diameter sides face each other. The rollers 9*a*, 9*b* are lubricated by the lubricant supplied via an oil passage 2*a* formed in the differential carrier case 2.

The companion flange 15, which is coupled to the propeller shaft side, is connected to the outer end portion 3*a* of the drive pinion 3 via splines, or the like, such that the companion flange 15 rotates in the same direction as the outer end portion 3*a* of the drive pinion 3. The companion flange 15 is fastened or secured to the outer end portion 3*a* of the drive pinion 3 using a fastener 3*n*, which is for example a nut. The inner end portion of the companion flange 15 abuts on the inner race of the roller 9*a* that is provided on the front side. With the fastener 3*n* tightened at a set torque, the 3 is pulled forward by constant force, whereby the drive pinion 3 is rotatably supported in a predetermined orientation at a predetermined position of the differential carrier case 2 together with the inner races of the rollers 9*a*, 9*b*.

Referring to FIG. 1 to FIG. 4, the torsional damper 11 is constituted of an annular mass portion 21 and an annular elastic portion 22. The annular elastic portion 22 is attached on the annular mass portion 21 and has a rubber elasticity. Likewise, the torsional damper 12, which is provided on the outer side of the torsional damper 11, is constituted of an annular mass portion 26 and an annular elastic portion 27. The annular elastic portion 27 is attached on the annular mass portion 26 and has a rubber elasticity. FIG. 2 shows the outer peripheral shape of a portion of the companion flange 15 and the outer peripheral shape of a portion of the annular mass portion 21 without showing the annular elastic portions 22, 27. The annular elastic portions 22, 27 are made of rubber or elastomer.

The annular mass portion 21 of the torsional damper 11 and the annular mass portion 26 of the torsional damper 12 are both annular surrounding the annular elastic portion 22 and the annular elastic portion 27, respectively. Referring to FIG. 3, the annular mass portion 21 of the torsional damper 11 has a pair of first inclined faces 23a, 23b that extend along the circumference of the torsional damper 11. The first inclined faces 23a, 23b are formed such that the annular elastic portion 22 deforms in a sheared manner as the torsional damper 11 moves in a rotational direction about the axis of the companion flange 15 and such that the annular elastic portion 22 partially deforms in a compressed manner as the torsional damper 11 moves in any direction other than said rotational direction.

On the other hand, referring to FIG. 4, the annular mass portion 26 of the torsional damper 12 has pairs of second inclined faces 28a, 28b that are spaced apart from each other along the circumference of the torsional damper 12 and extend in the axial direction of the companion flange 15. The second inclined faces 28a, 28b are formed such that the annular elastic portion 27 deforms in a sheared manner as the torsional damper 12 moves in the axial direction of the companion flange 15 and such that the annular elastic portion 27 partially deforms in a compressed manner as the torsional damper 12 moves in any direction other than the axial direction of the companion flange 15. The companion flange 15 has a pair of first opposite faces 24a, 24b that are opposed to the first inclined faces 23a, 23b in parallel, respectively.

The torsional dampers 11, 12 are stacked in the radial direction of the companion flange 15. The first inclined faces 23a, 23b are formed at the inner peripheral face of the annular mass portion 21 of the torsional damper 11 that is provided on the inner side of the torsional damper 12, and second opposite faces 29a, 29b are formed at the outer peripheral face of the annular mass portion 21 of the torsional damper 11 so as to face the respective second inclined faces 28a, 28b of the annular mass portion 26 of the torsional damper 12.

In this example embodiment, the annular mass portion 21 of the torsional damper 11 has a first convex portion 23 that protrudes toward the radially inner side of the annular mass portion 21 and extends annularly along the circumference of the annular mass portion 21. The first inclined faces 23a, 23b are formed by the first convex portion 23. The annular mass portion 26 of the torsional damper 12 has a plurality of second convex portions 28 that are evenly spaced apart from each other along the circumference of the annular mass portion 26 and extend in the axial direction of the torsional damper 12. The pairs of the second inclined faces 28a, 28b are formed by the respective second convex portions 28. The companion flange 15 has a first opposite concave portion 24 that is concaved so as to match the shape of the first convex portion 23 of the annular mass portion 21 of the torsional damper 11. The annular mass portion 21 of the torsional damper 11 has a plurality of concave portions 29 that are formed in the outer peripheral face of the annular mass portion 21 and correspond to the respective second convex portions 28 of the annular mass portion 26 of the torsional damper 12. The second opposite faces 29a, 29b are formed by each concave portion 29.

Note that the first convex portion 23 and the first opposite concave portion 24 may be each provided in plurality. Further, while the second convex portions 28 and the second opposite concave portions 29 extend in the rotational axis of the companion flange 15, that is, the rotation axis of the drive pinion 3, they may each include portions that are slightly inclined or curved. That is, the meaning of "extend in the rotation axis of the companion flange 15" is not limited to that the second convex portions 28 and the second opposite concave portions 29 extend straight in parallel with the rotational axis of the drive pinion 3 or with the rotational axis of the companion flange 15.

Constituted of the annular mass portion 21 having the first inclined faces 23a, 23b and the annular elastic portion 22 attached on the annular mass portion 21, the torsional damper 11 has a characteristic that the torsional resonance frequency of the torsional damper 11 is close to the torsional resonance frequency of the drive pinion 3 (will be referred to as "first characteristic"). Torsion of the drive pinion 3 occurs as torsion of the shaft of the drive pinion 3 that is caused by the rotational force input from the propeller shaft to the outer end portion 3a of the drive pinion 3 and the reactive force applied from the ring gear 4 to the mesh point between the drive pinion 3 and the ring gear 4. On the other hand, constituted of the annular mass portion 26 having the second inclined faces 28a, 28b and the annular elastic portion 27 attached on the annular mass portion 26, the torsional damper 12 has a characteristic that the longitudinal prying resonance frequency of the torsional damper 12 is close to the bending resonance frequency of the drive pinion 3 (will be referred to as "second characteristic"). "Longitudinal prying resonances" are resonances that cause the companion flange 15 and the outer end portion 3a of the drive pinion 3 to pitch back and forth about an imaginary axis running in the lateral direction of the vehicle, and such resonances are caused by bending resonances of the drive pinion 3.

Next, the effects of the above-described structure will be described.

In the example embodiment configured as described above, as the rotational force that has been output from a drive-force source mounted in the vehicle and then adjusted in its rotation speed at a transmission is input to the outer end portion 3a of the drive pinion 3, the ring gear 4, which is in mesh with the drive pinion 3, rotates at a reduced speed, whereby the differential housing 5 rotates. As the differential housing 5 thus rotates, the pinions 6a, 6b and the side gears 7a, 7b rotate together with the shaft 5a, whereby the rotational drive force is transmitted to the axles 8a, 8b ("output shaft"). When the axles 8a, 8b rotate at different speeds (different angular speeds) as the vehicle turns, the side gears 7a, 7b, which are connected to each other so as to allow differential motion therebetween, rotate relative to each other.

When the vehicle is running in such a state, the drive pinion 3 receives the rotational drive force input to the outer end portion 3a and the reactive force applied from the mesh point with the ring gear 4. Said reactive force changes as the drive pinion 3 and the ring gear 4 rotate, as the rotational drive force input to the drive pinion 3 changes, and as the reactive torques applied from the axles 8a, 8b change. Further, due to the bending vibration on the propeller shaft side, or due to changes in the suspension geometries, vibrations in bending directions are also input to the drive pinion 3 depending upon the drive state of the vehicle, so that vibrations that pries the companion flange 15 attached on the outer end portion 3a back and forth occur. Therefore, in the rear differential unit 1, vibrations tend to occur at the front end of the drive pinion 3, and resonances at the front end of the drive pinion 3 are transmitted to the vehicle body, causing so-called differential thrumming noises.

One of forces that cause resonances at the rotation input portion of the rear differential unit 1 is the force that causes vibrations at the mesh point between the drive pinion 3 and the ring gear 4 and thus causes cyclical response displacement of a case close to the outer end portion 3a of the drive pinion 3. This force can be determined from the mesh-point dynamic rigidity that represents the ratio of the amplitude of the cyclical response displacement of the rotation input portion of the rear differential unit 1 to the amplitude of the vibration at the mesh point between the drive pinion 3 and the ring gear 4.

However, this force can be effectively suppressed by setting the torsional resonance frequency of the torsional damper 11 provided at the companion flange 15 or in its vicinity to a value close to the torsional resonance frequency of the drive pinion 3.

That is, the torsional resonance frequency of the drive line including the drive pinion 3 determines the peak of the force that causes the cyclical response displacement of the case close to the outer end portion 3a of the drive pinion 3 through the vibrations at the mesh point between the drive pinion 3 and the ring gear 4. Therefore, the peak of the force can be suppressed by setting the torsional resonance frequency of the torsional damper 11 having the first characteristic, which is optimized to damp torsional resonances at its resonance frequency, to a value close to the torsional resonance frequency of the drive line including the drive pinion 3.

The vibration sensitivity of the rotation input portion of the rear differential unit 1, that is, the vibration sensitivity of the differential carrier case 2 provided near the outer end portion 3a of the drive pinion 3 determines the vibration peak of the rear differential unit 1, and said peak increases also due to bending resonances of the drive pinion 3. However, the vibration peak of the rear differential unit 1, which is determined by the vibration sensitivity of the differential carrier case 2 provided close to the outer end portion 3a of the drive pinion 3, can be effectively suppressed by setting the resonance frequency of the torsional damper 12, which has the second characteristic as mentioned above, to a value close to the frequency of the bending resonance of the drive pinion 3 that is caused by prying vibrations at the outer end portion 3a of the drive pinion 3.

Figure 5:
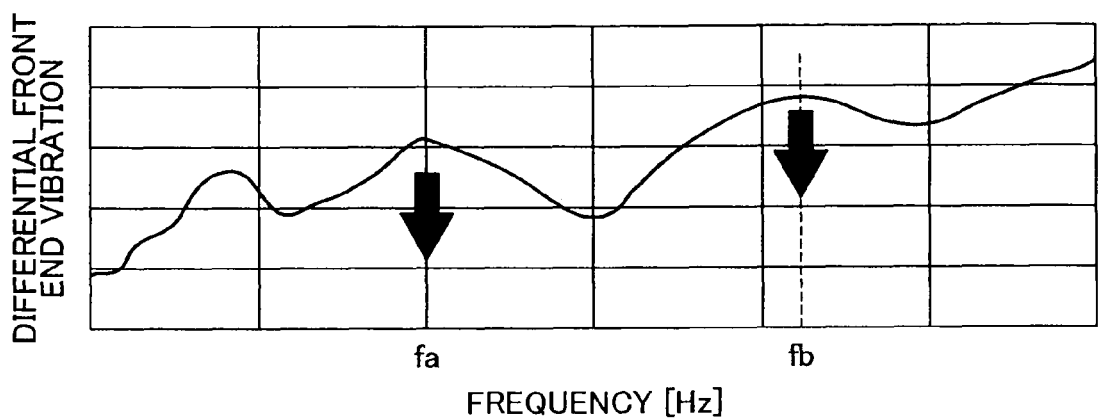
FIG. 5 is a vibration characteristic chart in which the vertical axis indicates the vibration level at the front end of a typical rear differential unit and the horizontal axis indicates the frequency of said vibration.

FIG. 5 is a vibration characteristic chart. The vertical axis of FIG. 5 represents the vibration level (dB) at the front end of a typical rear differential unit and the horizontal axis represents the frequency (Hz) of said vibration. In the vibration characteristic chart, the peak close to the frequency fa is caused by the force at the mesh point between the drive pinion 3 and the ring gear 4.

Figure 6:
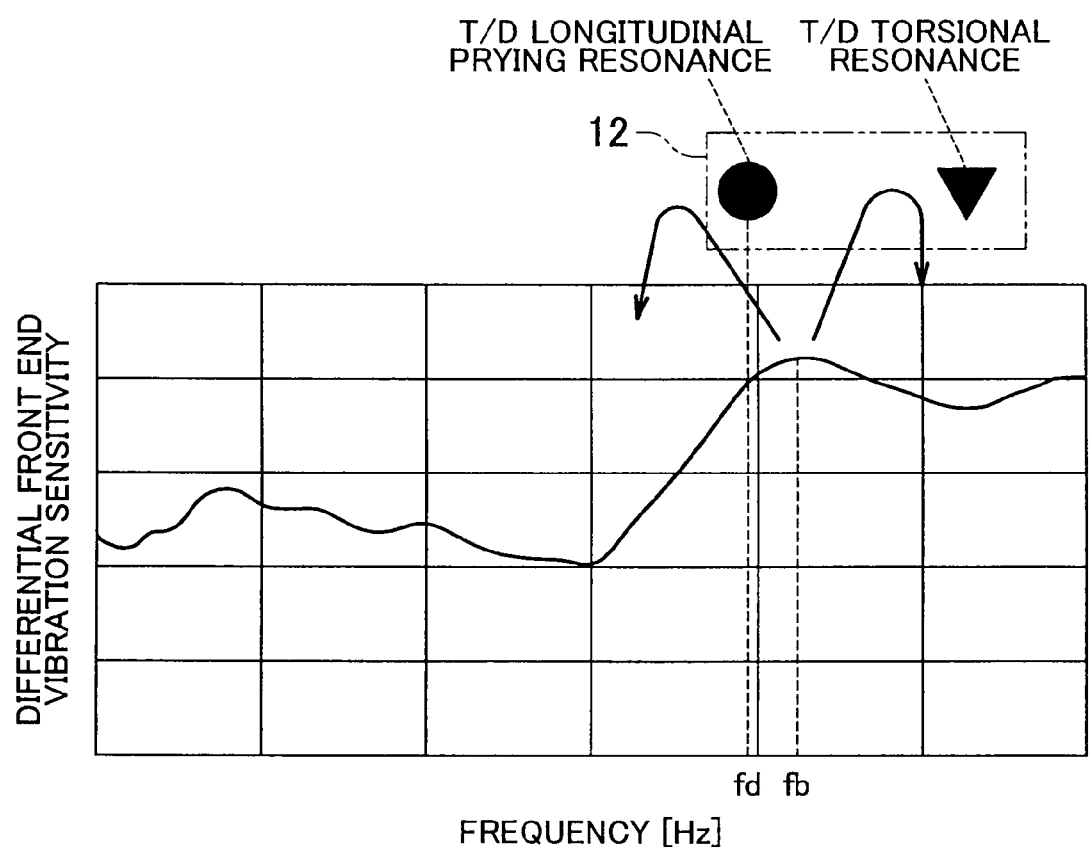
FIG. 6 is a frequency characteristic chart representing the vibration sensitivity of the front end of the differential unit in which the set value of the prying resonance frequency of the second-characteristic torsional damper of the damper device of the first example embodiment of the invention is indicated by the black dot.

FIG. 6 is a frequency characteristic chart representing the vibration sensitivity of the front end of the rear differential unit 1. In FIG. 6, the block dot represents the prying resonance frequency of the torsional damper 12 having the second characteristic. As shown in FIG. 6, the prying resonance frequency of the torsional damper 12 is set with respect to the vibration peak near the frequency fb that is determined by the vibration sensitivity of the rotation input portion of the rear differential unit 1 and its periphery (will be collectively referred to as "differential front end" where necessary). On the other hand, in FIG. 6, the black triangle represents the torsional resonance frequency of the torsional damper 12.

Referring to FIG. 6, the prying resonance frequency of the torsional damper 12 having the second characteristic, which is indicated by the black dot, is set close to the frequency fb corresponding to the peak of the vibration sensitivity of the differential front end for resonances on the side of the drive pinion 3 and the ring gear 4, and the torsional resonance frequency of the torsional damper 12 having the second characteristic, which is indicated by the black triangle, is set in a range where the vibration sensitivity of the differential front end for vibrations on the ring gear 4 side slightly decreases from the peak.

Figure 7:
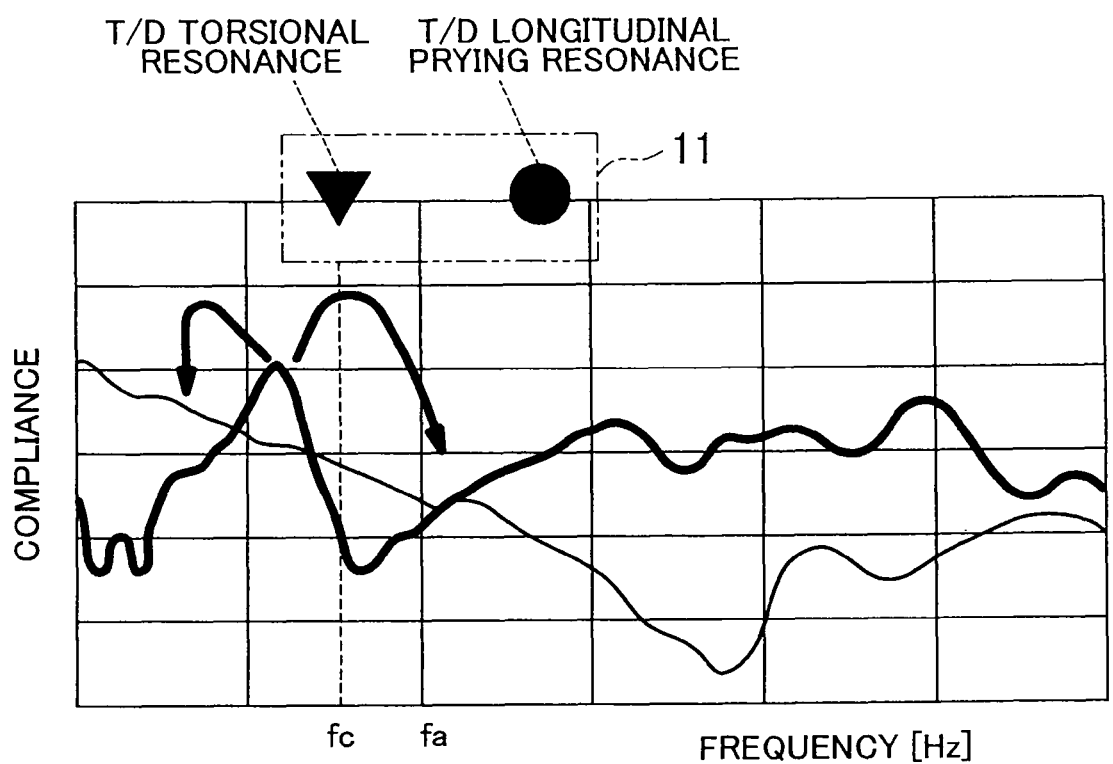
FIG. 7 is a frequency characteristic chart representing the mesh-point compliance of the differential unit in which the set value of the torsional resonance frequency of the first-characteristic torsional damper of the damper device of the first example embodiment of the invention is indicated by the triangle.

In FIG. 7, the vibration sensitivity of the differential front end for vibrations on the drive pinion 3 side is indicated by the bold curve, and the vibration sensitivity of the differential front end for vibrations on the ring gear 4 side is indicated by the narrow curve.

In FIG. 7, the black triangle represents the torsional resonance frequency of the torsional damper 11 having the first characteristic for damping torsional resonances at the resonance frequency, and the black dot represents the prying resonance frequency of the torsional damper 11. Further, the bold curve represents the compliance of the drive pinion 3 side against vibrations, and the narrow curve represents the compliance of the ring gear 4 side against vibrations.

Referring to FIG. 7, the torsional resonance frequency of the torsional damper 11 is set close to the torsional resonance frequency fc of the drive pinion 3 side that determines the peak close to the frequency fa of the rear differential unit 1, and the prying resonance frequency of the torsional damper 11 is set higher than the torsional resonance frequency fc of the drive pinion 3, for example, between fc and fb.

In this example embodiment, the torsional damper 11 has the first characteristic that the annular elastic portion 22 of the torsional damper 11 deforms in a sheared manner under torsional vibrations and it deforms in a compressed manner under longitudinal prying vibrations. The longitudinal prying resonance frequency of the torsional damper 11 can be adjusted as needed, while maintaining its torsional resonance frequency at a desired value, by changing the number of the first convex portion 23 and the inclination angles of the first inclined faces 23a, 23b of the first convex portion 23. On the other hand, the torsional damper 12 has the second characteristic that the annular elastic portion 27 of the torsional damper 12 deforms in a sheared manner under longitudinal prying vibrations and it deforms in a compressed manner under torsional vibrations. The torsional resonance frequency of the torsional damper 12 can be adjusted as needed, while maintaining its longitudinal prying resonance frequency at a desired value, by changing the number of the second convex portions 28 and the inclination angles of the inclined faces 28a, 28b of each second convex portion 28.

Figure 8:
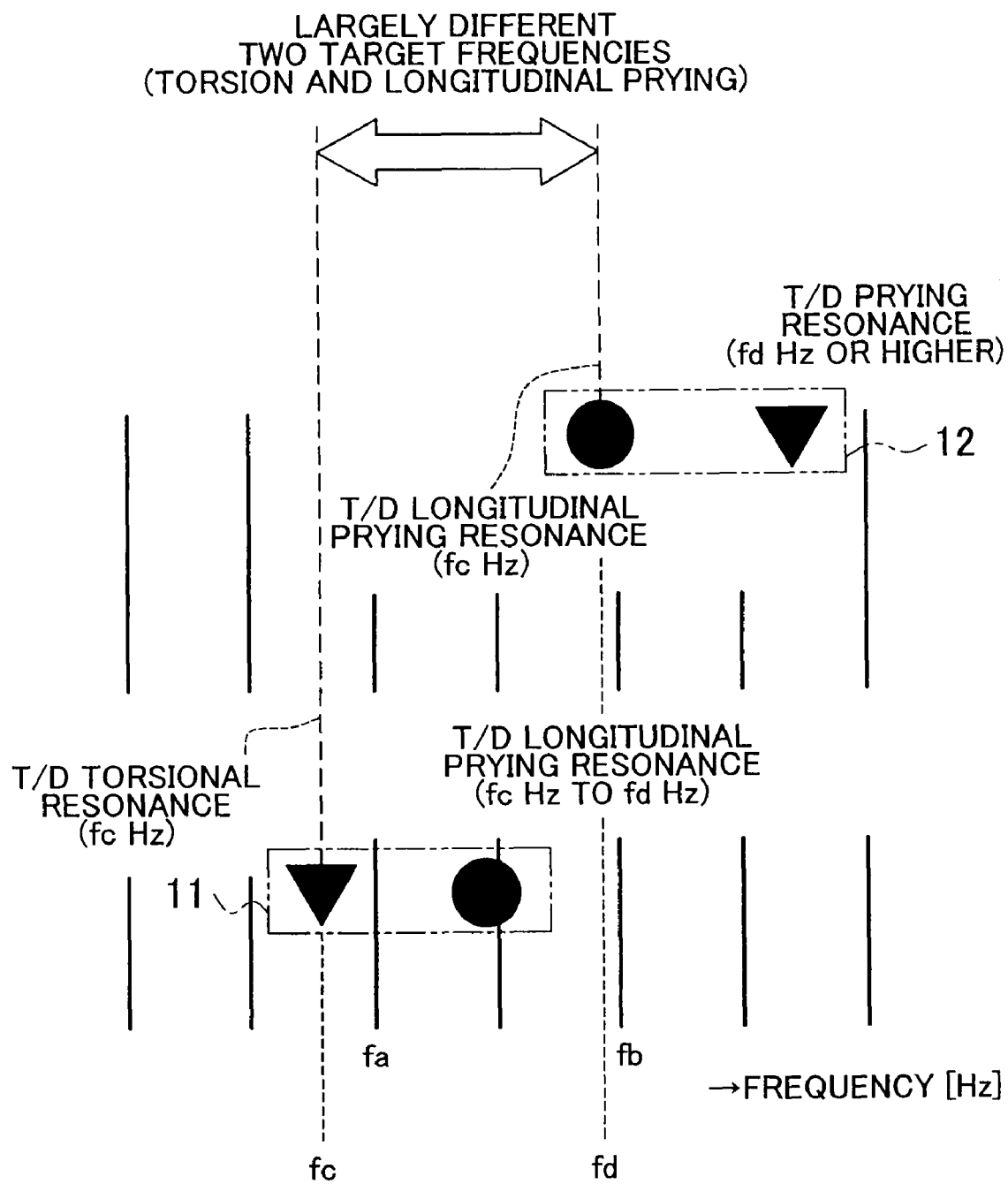
FIG. 8 is a view illustrating the conditions for setting the resonance frequencies of the first-characteristic torsional damper and the second-characteristic torsional damper of the damper device of the first example embodiment of the invention.

As such, as shown in FIG. 6 to FIG. 8, desired vibration-damping effects of the torsional dampers 11, 12 can be obtained by setting the resonance frequencies of the torsional dampers 11, 12 to a value for damping torsional resonances and a value for damping prying resonances, respectively, which are significantly different in frequency from each other, that is, by setting the resonance frequency of one of the torsional dampers 11, 12 to the resonance frequency fc that is suitable for damping torsional resonances and setting the resonance frequency of the other of the torsional dampers 11, 12 to the frequency fd or fb that is suitable for damping prying resonances and is different from the resonance frequency fc by, for example, several hundreds hertz. Further, because the torsional dampers 11, 12 are stacked in the radial direction of the companion flange 15, the damper device 10 is short in its axial direction. Thus, it is possible to provide a damper device that provides desired vibration-damping effects against multiple resonances largely different in frequency and but is compact enough to be fit in a limited space at the input portion of a rear differential unit.

As such, the longitudinal resonance frequency, or the like, of the torsional damper 11 that is constituted of the annular mass portion 21 having the first inclined faces 23a, 23b and the annular elastic portion 22 attached on the annular mass portion 21 can be adjusted as needed while maintaining its torsional resonance frequency at a desired value. On the other hand, the torsional resonance frequency of the torsional damper 12 that is constituted of the annular mass portion 26 having the second inclined faces 28a, 28b and the annular elastic portion 27 attached on the annular mass portion 26 can be adjusted as needed while maintaining its longitudinal prying resonance frequency, or the like, at a desired value. Incorporating the torsional dampers 11, 12 stacked on top of each other, the damper device 10 can be made a compact damper device that provides desired vibration-damping effects for multiple target resonances having resonance frequencies largely different from each other.

Further, the rigidity of the annular elastic portion 22 of the torsional damper 11 against longitudinal prying forces can be set to, for example, a high value in a wide range, and thus the longitudinal prying resonance frequency of the torsional damper 11 can be adjusted to a frequency largely different from the torsional resonance frequency of the torsional damper 11 while maintaining said torsional resonance frequency at a desired value. On the other hand, the rigidity of the annular elastic portion 27 of the torsional damper 12 against torsional vibration force can be set to, for example, a high value in a wide range, and thus the torsional resonance frequency of the torsional damper 12 can be adjusted to a frequency largely different from the longitudinal prying resonance frequency of the torsional damper 12 while maintaining said longitudinal prying resonance frequency at a desired value. As such, it is possible to provide a compact damper device that provides desired vibration-damping effects for multiple target resonances having resonance frequencies largely different from each other.

Second Example Embodiment

Figure 9:
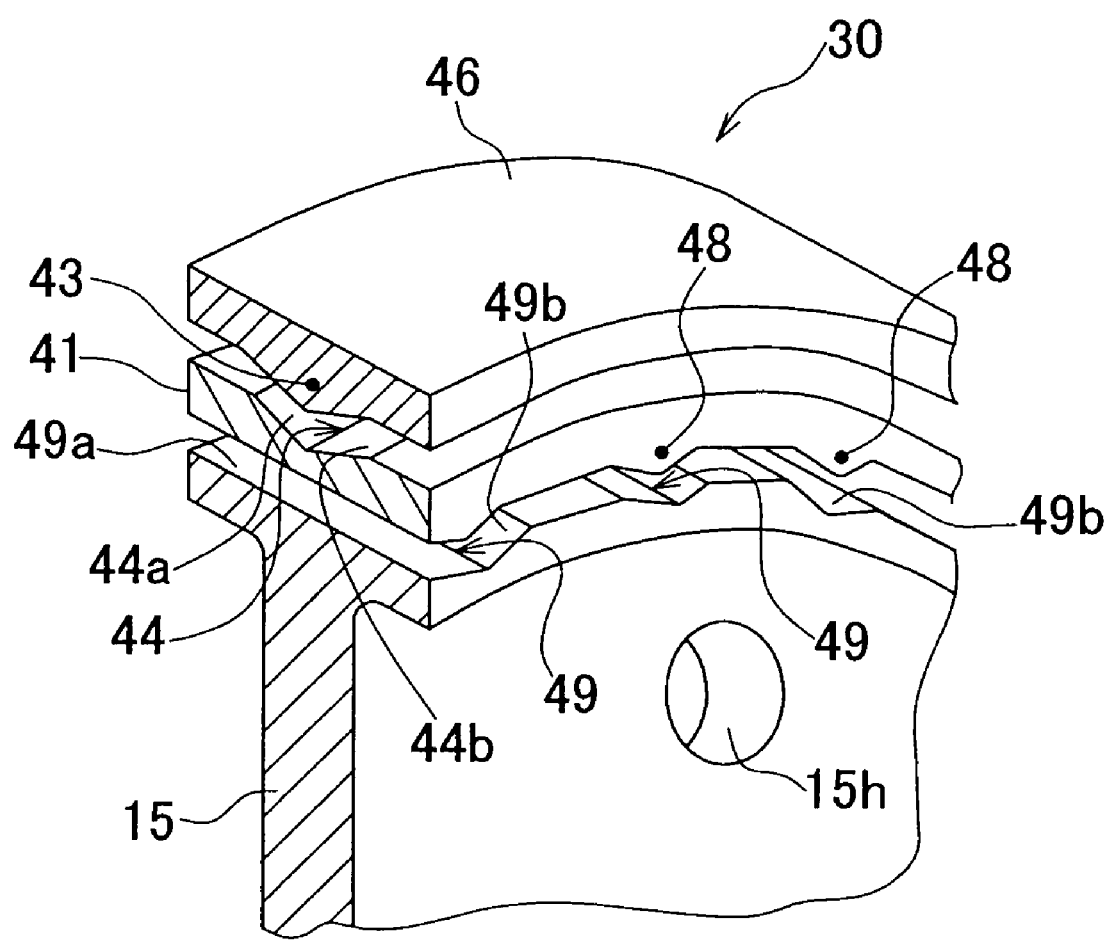
FIG. 9 is an enlarged cross-sectional perspective view of a portion of a damper device according to the second example embodiment of the invention.
Figure 10:
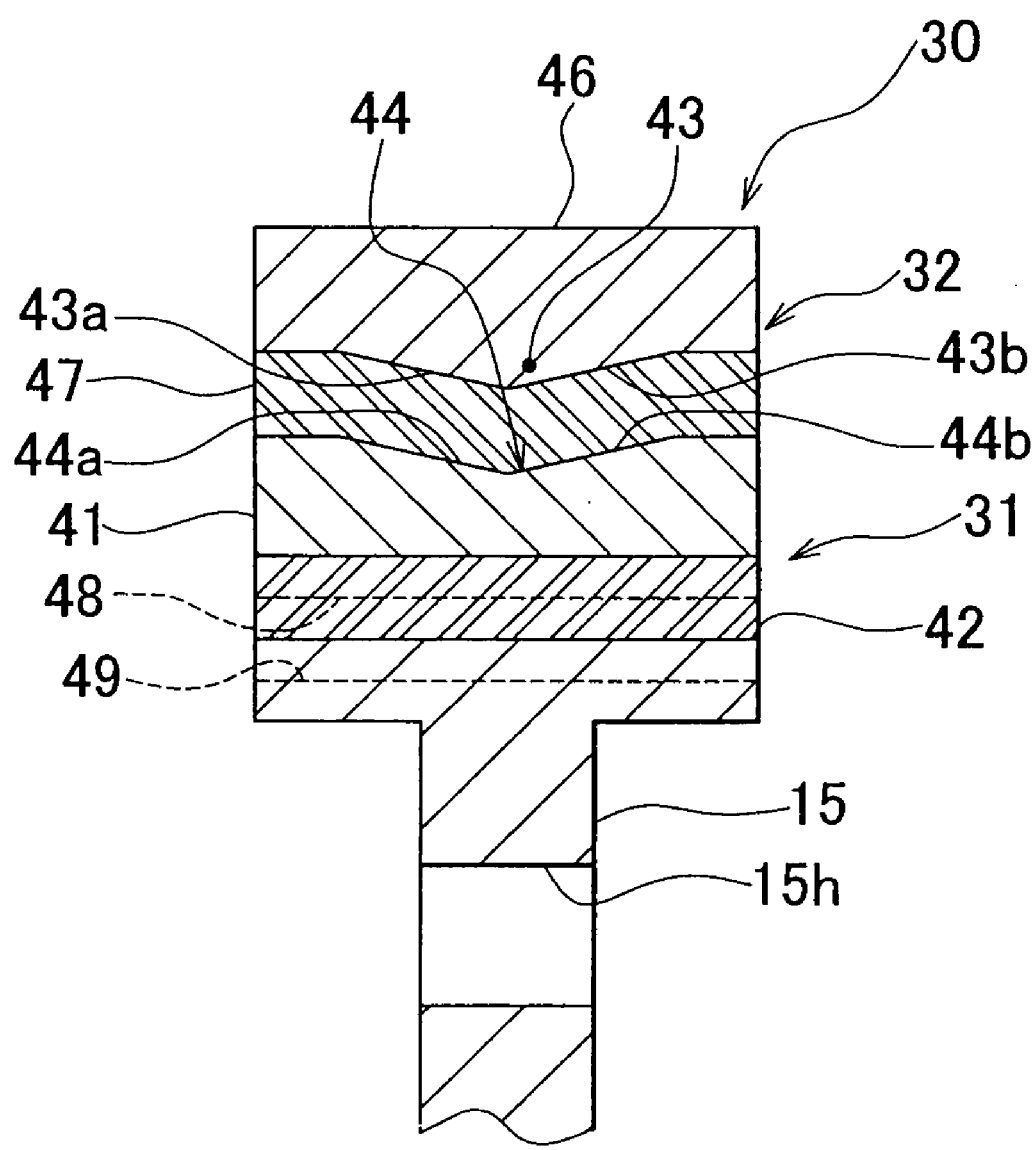
FIG. 10 is an enlarged cross-sectional side view of a portion of the damper device according to the second example embodiment of the invention.
Figure 11:
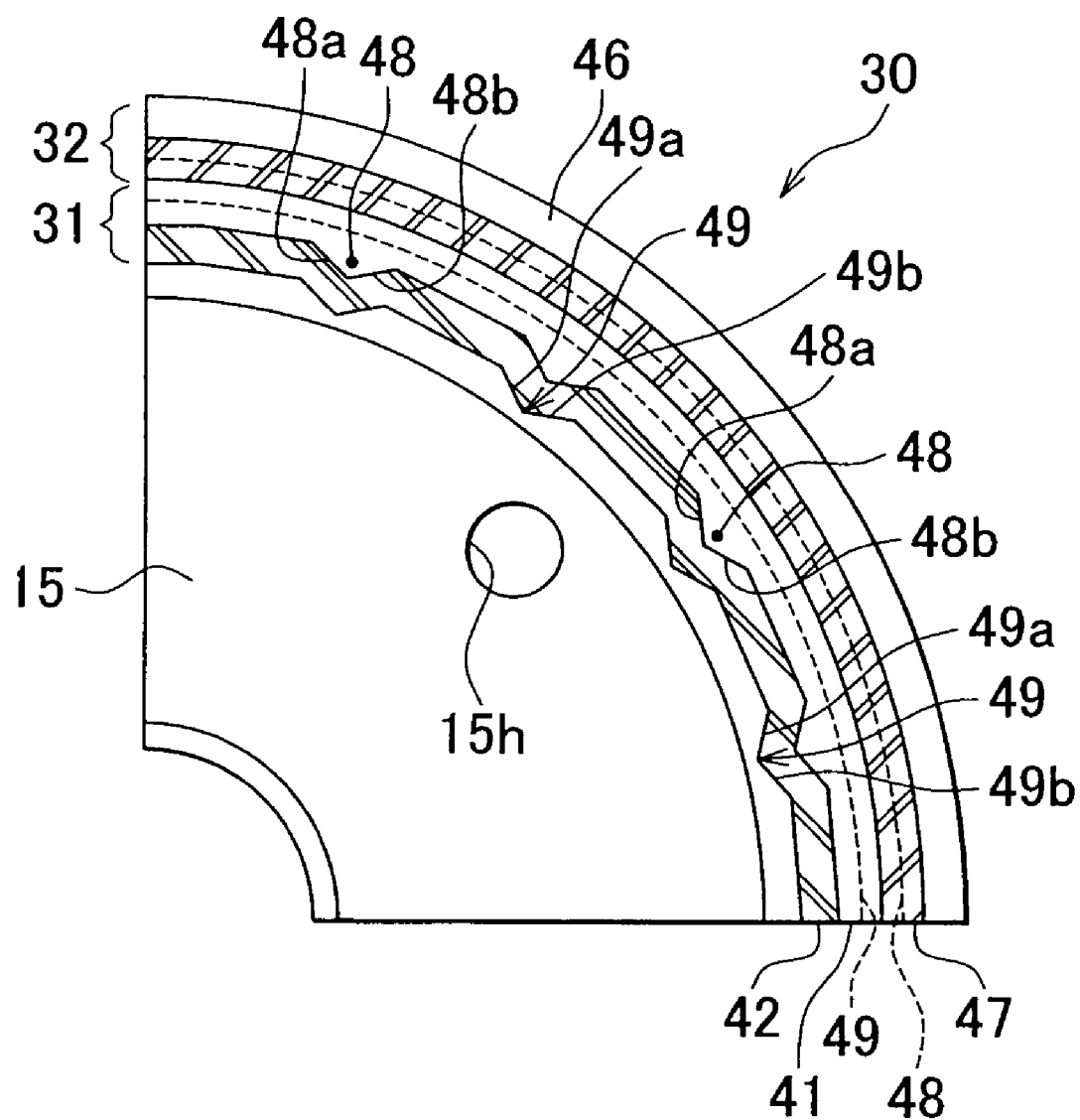
FIG. 11 is a cross-sectional front view of a portion of the damper device according to the second example embodiment of the invention.

FIG. 9 is an enlarged cross-sectional perspective view of a portion of a damper device 30 according to the second example embodiment of the invention, and FIG. 10 is an enlarged cross-sectional side view of a portion of the damper device 30, and FIG. 11 is a cross-sectional front view of a portion of the damper device 30. Like the above-described damper device 10 of the first example embodiment, the damper device 30 of the second example embodiment is provided at the input portion of a rear differential unit for rear-drive vehicles, and therefore the portions and parts of the damper device 30 of the second example embodiment that are identical to those of the damper device 10 of the first example embodiment are not identified in FIG. 9 to FIG. 11, and they are denoted, in the following description, by the same reference numerals as those used in the foregoing description on the first example embodiment.

Referring to FIG. 10, the damper device 30 has torsional dampers 31, 32 that are stacked on the outer peripheral face of the companion flange 15 in the radial direction of the companion flange 15, and annular mass portions 41, 46 of the torsional damper 31, 32 are annular surrounding annular elastic portions 42, 47, respectively.

Referring to FIG. 10, the annular mass portion 46 of the torsional damper 32 has a pair of first inclined faces 43a, 43b that extend along the circumference of the torsional damper 32. The first inclined faces 43a, 43b are formed such that the annular elastic portion 47 deforms in a sheared manner as the torsional damper 32 moves in a rotational direction about the axis of the companion flange 15 and such that the annular elastic portion 47 partially deforms in a compressed manner as the torsional damper 32 moves in any direction other than said rotational direction.

On the other hand, referring to FIG. 11, the annular mass portion 41 of the torsional damper 31 has pairs of second inclined faces 48a, 48b that are spaced apart from each other along the circumference of the torsional damper 31 and extend in the axial direction of the companion flange 15. The second inclined faces 48a, 48b are formed such that the annular elastic portion 42 deforms in a sheared manner as the torsional damper 31 moves in the axial direction of the companion flange 15 and such that the annular elastic portion 42 partially deforms in a compressed manner as the torsional damper 31 moves in any direction other than the axial direction of the companion flange 15. The companion flange 15 has a pair of second opposite faces 49a, 49b that are opposed to the second inclined faces 48a, 48b in parallel, respectively.

The torsional dampers 31, 32 are stacked in the radial direction of the companion flange 15. The first inclined faces 43a, 43b are formed at the inner peripheral face of the annular mass portion 41 of the torsional damper 31 that is provided on the inner side of the torsional damper 32, and first opposite faces 48a, 48b are formed at the outer peripheral face of the annular mass portion 41 of the torsional damper 31 so as to face the first inclined faces 43a, 43b of the annular mass portion 43 of the torsional damper 32.

The annular mass portion 46 of the torsional damper 32 has a first convex portion 43 that protrudes toward the radially inner side of the annular mass portion 46 and extends annularly along the circumference of the annular mass portion 46. The first inclined faces 43a, 43b are formed by the first convex portion 43. The annular mass portion 41 of the torsional damper 31 has a plurality of second convex portions 48 that are evenly spaced apart from each other along the circumference of the annular mass portion 41 and extend in the axial direction of the torsional damper 31. The pairs of the second inclined faces 48a, 48b are formed by the respective second convex portions 48. The companion flange 15 has second opposite concave portions 49 that are concaved so as to match the shapes of the second convex portions 48 of the annular mass portion 41 of the torsional damper 31.

The torsional resonance frequency of the torsional damper 32, which is constituted of the annular mass portion 46 having the first inclined face 43a, 43b and the annular elastic portion 47 attached on the annular mass portion 46, is set to a value close to the torsional resonance frequency of the drive pinion 3. While the annular elastic portion 27 and the annular mass portion 26, which are located on the outer side of the annular mass portion 21, also act as inertia masses in the torsional direction in the first example embodiment of the invention, the torsional resonance characteristic of the damper device 30 of the second example embodiment is determined by the mass of the annular mass portion 46 and the elasticity of the annular elastic portion 47.

On the other hand, the longitudinal prying resonance frequency of the torsional damper 31, which is located on the inner side of the torsional damper 32 and is constituted of the annular mass portion 41 having the second inclined faces 48a, 48b and the annular elastic portion 42 attached on the annular mass portion 41, is set to a value close to the bending resonance frequency of the drive pinion 3. In this case, the torsional damper 30, which is provided on the outer side, also acts as an inertia mass when longitudinal prying vibrations are applied to the torsional damper 31, which is provided on the inner side.

As such, the longitudinal resonance frequency, or the like, of the torsional damper 32 that is constituted of the annular mass portion 46 having the first inclined faces 43a, 43b and the annular elastic portion 47 attached on the annular mass portion 46 can be adjusted as needed while maintaining its torsional resonance frequency at a desired value. On the other hand, the torsional resonance frequency of the torsional damper 31 that is constituted of the annular mass portion 41 having the second inclined faces 48a, 48b and the annular elastic portion 42 attached on the annular mass portion 41 can be adjusted as needed while maintaining its longitudinal prying resonance frequency, or the like, at a desired value. Incorporating the torsional dampers 31, 32 stacked on top of each other, the damper device 30 can be made a compact damper device that provides desired vibration-damping effects for multiple target resonances having resonance frequencies largely different from each other, like the damper device 10 of the first example embodiment.

In the second example embodiment, the position of the torsional damper having the first characteristic making its torsional resonance frequency adjustable as a target value and the position of the torsional damper having the second characteristic making its longitudinal prying resonance frequency adjustable as a target value are reversed from the first example embodiment, and therefore the resonance frequency setting for the damper device 30 can be performed differently from that for damper device 10 of the first example embodiment.

While the inertia mass is increased by forming the convex portions on the annular mass portion such that they protrude into the annular elastic portion in the damper device 10 of the first example embodiment and the damper device 30 of the second example embodiment, the inertia mass may be, if appropriate, reduced by forming convex portions on the annular elastic portion such that they protrude into the annular mass portion as described in detail below.

That is, the annular mass portion of one of the two torsional dampers has a first concave portion that is concaved in the radial direction of the annular mass portion and extends along the circumference of the annular mass portion so as to form first inclined faces, and the annular mass portion of the other of the two torsional dampers has a plurality of second concave portions that are spaced apart from each other along the circumference of the annular mass portion and extend in the axial direction so as to form pairs of second inclined faces, and a first opposite convex portion having first opposite faces and corresponding to the first concave portion of the one of the torsional dampers may be formed at any of the elastic portions of the torsional dampers and the companion flange 15, a plurality of second opposite convex portions having pairs of second opposite faces and corresponding to the second concave portions of the other of the torsional dampers may be formed at any of the elastic portions of the torsional dampers and the companion flange 15.

In this case, too, the annular elastic portion of one of the torsional dampers is sandwiched between the first concave portion and the first opposite convex portion, and the rigidity of said annular elastic portion against longitudinal prying forces can be set to, for example, a high value in a wide range, and therefore the longitudinal prying resonance frequency of the torsional damper can be set to a target value while maintaining its torsional resonance frequency at a desired value even if said target value is largely different from the torsional resonance frequency. On the other hand, the annular elastic portion of the other torsional damper is sandwiched between the second concave portions, which are spaced apart from each other along the circumference of said torsional damper and extend in the axial direction of said torsional damper, and the second opposite faces corresponding to the second concave portions, and the rigidity of said annular elastic portion against vibration forces in rotational directions can be set to, for example, a given high value in a wide range, and therefore the torsional resonance frequency of the annular elastic portion can be set to a target value while maintaining its longitudinal prying resonance frequency at a desired value even if said target value is largely different from the longitudinal prying resonance frequency. As such, it is possible to provide a compact damper device that provides desired vibration-damping effects for multiple target resonances having resonance frequencies largely different from each other.

According to the damper device 10 of the first example embodiment and the damper device 30 of the second example embodiment, the two torsional dampers are stacked on top of each other, and one of the two torsional dampers has the first characteristic that enables the longitudinal prying resonance frequency, or the like, of the torsional damper to be adjusted as needed while maintaining the torsional resonance frequency of the torsional damper at a desired value, and the other of the two torsional dampers has the second characteristic that enables the torsional resonance frequency of the torsional damper to be adjusted as needed while maintaining the longitudinal prying resonance frequency, or the like, of the torsional damper at a desired value. According to the invention, however, such torsional dampers having different characteristics are not necessarily stacked. For example, three or more torsional dampers having different characteristics may be arranged in a given combination as in the third example embodiment of the invention described below.

Third Example Embodiment

Figure 12:
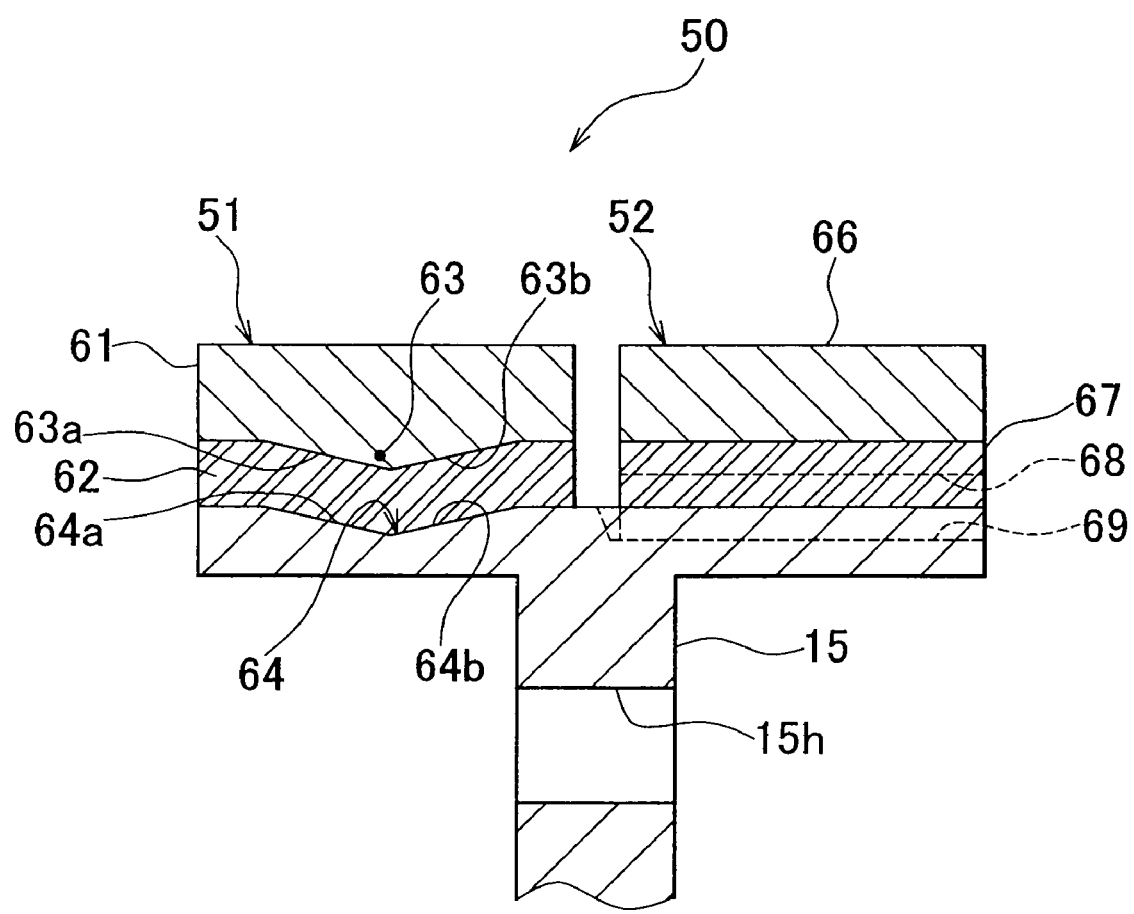
FIG. 12 is an enlarged cross-sectional perspective view of a damper device according to the third example embodiment of the invention.

FIG. 12 is an enlarged cross-sectional perspective view of a damper device 50 according to the third example embodiment of the invention.

Like the damper device 10 of the first example embodiment, the damper device 50 of the third example embodiment is provided at the input portion of a rear differential unit for rear-drive vehicles, and therefore the portions and parts of the damper device 50 that are identical to those of the damper device 10 of the first example embodiment are not identified in FIG. 12 and they are denoted, in the following description, by the same reference numerals as those used in the foregoing description on the first example embodiment.

Referring to FIG. 12, the damper device 50 of the third example embodiment has a torsional damper 51 having a first characteristic that enables the longitudinal prying resonance frequency, or the like, of the torsional damper 51 to be adjusted as needed while maintaining the torsional resonance frequency of the torsional damper 51 at a desired value and a torsional damper 52 having a second characteristic that enables the torsional resonance frequency of the torsional damper 52 to be adjusted as needed while maintaining the longitudinal prying resonance frequency, or the like, of the torsional damper 52 at a desired value. The torsional dampers 51, 52 are arranged in the axial direction of the companion flange 15 in parallel at a certain interval so as to be adjacent to each other.

Annular mass portions 61, 66 of the torsional dampers 51, 52 are annular surrounding annular elastic portions 62, 67, respectively. The annular mass portion 61 of the torsional damper 51 is formed such that the annular elastic portion 62 deforms in a sheared manner as the torsional damper 51 moves in a rotational direction about the axis of the companion flange 15 and such that the annular elastic portion 62 partially deforms in a compressed manner as the torsional damper 51 moves in any direction other than said rotational direction. On the other hand, the annular mass portion 66 of the torsional damper 52 is formed such that the annular elastic portion 67 deforms in a sheared manner as the torsional damper 52 moves in the axial direction of the companion flange 15 and such that the annular elastic portion 67 partially deforms in a compressed manner as the torsional damper 52 moves in any direction other than the axial direction of the companion flange 15.

The companion flange 15 has a first opposite concave portion 64 opposed to a first convex portion 63 that extends on the inner peripheral face of the annular mass portion 61 of the torsional damper 51, and first inclined faces 63a, 63b of the first convex portion 63 are opposed to a pair of first opposite faces 64a, 64b of the first opposite concave portion 64, respectively, across the annular elastic portion 62. Although not shown in detail in the drawings, the annular mass portion 66 of the torsional damper 52 has a plurality of second convex portions 68 that extend in the axial direction of the torsional damper 52 and are evenly spaced along the circumference of the annular mass portion 66, and pairs of second inclined faces (not denoted by reference numerals) are formed by the respective second convex portions 68. The companion flange 15 has second opposite concave portions 69 that are opposed to the second convex portions 68 of the torsional damper 52, and pairs of second opposite faces (not denoted by reference numerals) are formed by the respective second opposite concave portions 69.

According to the damper device 50 of the third example embodiment, the torsional resonance frequency of the torsional damper 51 is set to a value close to the torsional resonance frequency of the drive pinion 3, and the longitudinal prying resonance frequency of the torsional damper 52 is set to a value close to the bending resonance frequency of the drive pinion 3. Note that the resonance characteristics of the damper device 50 for the resonances in the torsional directions are determined by the mass of the annular mass portion of the torsional damper 51 and the elasticity of the annular elastic portion of the torsional damper 51, and the resonance characteristics of the damper device 50 for the resonances in the prying directions are determined by the mass of the annular mass portion of the torsional damper 52 and the elasticity of the annular elastic portion of the torsional damper 52.

The longitudinal prying resonance frequency, or the like, of the torsional damper 51 can be adjusted as needed while maintaining its torsional resonance frequency at a desired value, and the torsional resonance frequency of the torsional damper 52 can be adjusted as needed while maintaining its longitudinal prying resonance frequency at a desired value. Incorporating the torsional dampers 51, 52, the damper device 50 of the third example embodiment reliably provides desired vibration-damping effects for resonances having frequencies largely different from each other, like the damper device 10 of the first example embodiment and the damper device 30 of the second example embodiment. Further, because the torsional dampers 51, 52 are arranged so as to be adjacent to each other in the direction of the rotational axis of the companion flange 15, the damper device 50 can be made a compact damper device having a small radius.

Forth Example Embodiment

Figure 13:
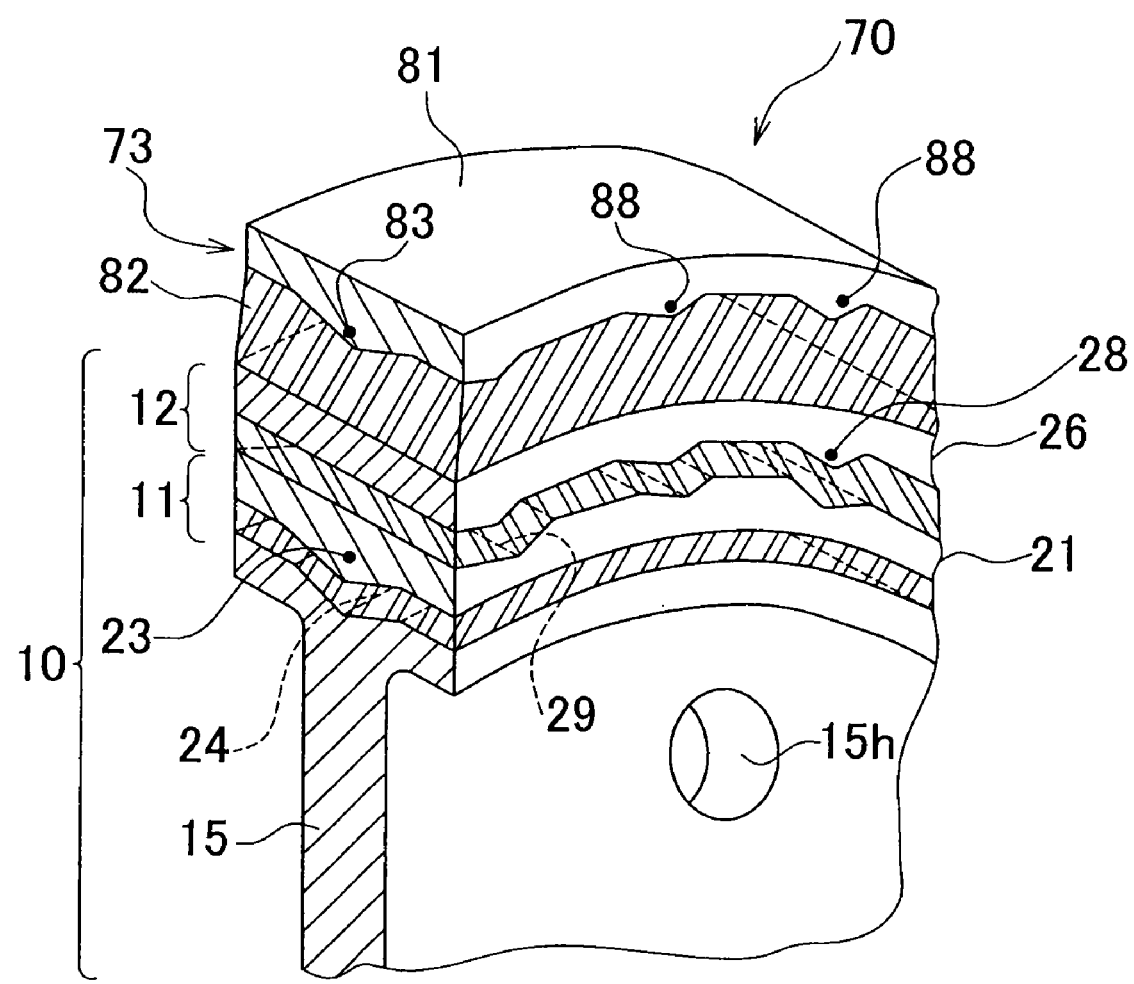
FIG. 13 is an enlarged cross-sectional perspective view of a damper device according to the fourth example embodiment of the invention.

FIG. 13 is an enlarged cross-sectional perspective view of a damper device 70 according to the fourth example embodiment of the invention.

Referring to FIG. 13, the damper device 70 is produced by adding a torsional damper 73 on the outer side of the damper device 10 of the first example embodiment. The torsional damper 73 has a third characteristic for damping resonances in the axial direction.

More specifically, the damper device 70 is constituted of the torsional dampers 11, 12, and 73 that have different characteristics and are stacked in this order on the outer peripheral face of the companion flange 15 in the radial direction. The annular mass portions 21, 26, and 81 of the torsional dampers 11, 12, 73 are annular surrounding the annular elastic portions 22, 27, and 82, respectively.

The annular mass portion 81 of the torsional damper 73 has a first convex portion 83 (having a pair of first inclined faces not denoted by reference numerals) that extends annularly along the circumference of the annular mass portion 81 on the inner side thereof and a plurality of second convex portions 88 (each having a pair of second inclined faces not denoted by reference numerals) that extend in the axial direction of the annular mass portion 81 and spaced apart from each other along the circumference of the annular mass portion 81. According to this structure, the annular elastic portion 82 partially deforms in a compressed manner both when the torsional damper 73 moves in a rotational direction about the axis of the companion flange 15 and when the torsional damper 73 moves in a direction other than said rotational direction with respect to the companion flange 15. The thickness of the annular elastic portion 82 is larger than the thicknesses of the annular elastic portion 22, 27 on the inner side, and thus the annular elastic portion 82 provides a large flexibility perpendicular to the axis.

The resonance frequency of the torsional damper 73 for vibrations perpendicular to the axis of the companion flange 15 and the axis of the drive pinion 3 is set to a value close to the resonance frequencies of the companion flange 15 and the drive pinion 3 for resonances perpendicular to the axis of the companion flange 15 and the axis of the drive pinion 3 (radial direction), and the torsional resonance frequency and the prying resonance frequency of the torsional damper 73 can be adjusted as needed by setting the number of the first convex portion 83 and the second convex portions 88 and the inclination angles of the inclined faces of the first convex portion 83 and the second convex portions 88 appropriately.

As in the forgoing example embodiments, the longitudinal prying resonance frequency, or the like, of the torsional damper 11 can be adjusted as needed while maintaining its torsional resonance frequency at a desired value, the torsional resonance frequency of the torsional damper 12 can be adjusted as needed while maintaining its longitudinal prying resonance frequency, or the like, at a desired value, and the torsional resonance frequency and the prying resonance frequency of the torsional damper 73 can be adjusted as needed while maintaining its resonance frequency for resonances perpendicular to the axis. Incorporating the torsional dampers 11, 12, and 73, the damper device 70 of the fourth example embodiment reliably provides vibration-damping effects for resonances having frequencies largely different from each other, like the damper devices of the foregoing example embodiments of the invention.

Further, the torsional damper 73 having a characteristic different from any of the torsional dampers incorporated in the damper devices of the foregoing example embodiments is additionally incorporated in the damper device 70 of the fourth example embodiment. Because of this structure, for example, it is possible to set the resonance frequency of the torsional damper 73 for resonances occurring perpendicularly to the axis of the torsional damper 73 to a desired value between its torsional resonance frequency that is set to, for examples, 350 Hz and its prying resonance frequency that is set to, for example, 600 Hz. Therefore, the damper device 70 provides stronger vibration-damping effects than those provided by the damper devices of the foregoing example embodiments.

As another example, a torsional damper the longitudinal prying resonance frequency of which can be adjusted as needed while maintaining its torsional resonance frequency at a desired value (e.g., the torsional damper 51 of the third example embodiment) and a torsional damper the torsional resonance frequency and the prying resonance frequency of which can be adjusted as needed while maintaining its resonance frequency for resonances perpendicular to the axis (e.g., the torsional damper 73 of the fourth example embodiment) may be stacked on top of each other in the radial direction of the damper device or may be arranged in adjacent to each other in the axial direction of the damper device. As another example, a torsional damper the torsional resonance frequency of which can be adjusted as needed while maintaining its longitudinal prying resonance frequency at a desired value (e.g., the torsional damper 52 of the third example embodiment) and a torsional damper the torsional resonance frequency and the prying resonance frequency of which can be adjusted as needed while maintaining its resonance frequency for resonances perpendicular to the axis of the torsional damper (e.g., the torsional damper 73 of the fourth example embodiment) may be stacked on top of each other in the radial direction of the damper device or may be arranged in adjacent to each other in the axial direction of the damper device. In either of these two examples, the damper device can be made a compact damper device that provides desired vibration-damping effects for multiple target resonances having resonance frequencies largely different from each other, like the damper devices of the foregoing example embodiments of the invention.

While the first inclined faces and the second inclined faces are flat faces in the foregoing example embodiments of the invention, they may be formed otherwise. For example, the first inclined faces and the second inclined faces may be curved faces.

As described above, the damper devices of the invention each incorporate a torsional damper which is constituted of a mass portion having first inclined faces and an elastic portion attached on the mass portion and the longitudinal prying resonance frequency, or the like, of which can be adjusted as needed while maintaining its torsional resonance frequency at a desired value and a torsional damper which is constituted of a mass portion having second inclined faces and an elastic portion attached on the mass portion and the torsional resonance frequency of which can be adjusted as needed while maintaining its longitudinal prying resonance frequency, or the like, at a desired value. According to the invention, as such, it is possible to provide a compact damper device that provides desired vibration-damping effects for multiple target resonances having resonance frequencies largely different from each other, and the invention can be effectively applied to various damper devices incorporating mass portions and elastic portions, in particular, to various damper devices incorporating a plurality of torsional dampers having different characteristics and together supported on a rotational element.

While the invention has been described with reference to what are considered to be preferred example embodiments thereof, it is to be understood that the invention is not limited to the disclosed embodiments or constructions. On the contrary, the invention is intended to cover various modification and equivalent arrangements. In addition, while the various elements of the disclosed invention are shown in various combinations and configurations, which are exemplary, other combinations and configurations, including more, fewer, or only a single element, are also within the scope of the invention.

What is claimed is:

1. A damper device comprising:
    a first torsional damper that has a mass portion and an elastic portion attached on the mass portion; and
    a second torsional damper that has a mass portion and an elastic portion attached on the mass portion and has a characteristic different from a characteristic of the first torsional damper, wherein
    the first torsional damper and the second torsional damper are provided on a rotational element that rotates about a rotational axis,
    the mass portion of the first torsional damper is annular and surrounds the elastic portion of the first torsional damper, and the mass portion of the second torsional damper is annular and surrounds the elastic portion of the second torsional damper,
    the mass portion of the first torsional damper has a first inclined face that extends along the circumference of the mass portion of the first torsional damper such that the elastic portion of the first torsional damper deforms in a sheared manner as the mass portion of the first torsional damper moves, with respect to the rotational element, in a rotational direction about the rotation axis of the rotational element and such the elastic portion of the first torsional damper partially deforms in a compressed manner as the mass portion of first torsional damper moves, with respect to the rotational element, in a direction other than the rotational direction,
    the mass portion of the second torsional damper has a plurality of second inclined faces that extend in an axial direction of the rotational element and are spaced apart from each other along the circumference of the mass portion of the second torsional damper such that the elastic portion of the second torsional damper deforms in a sheared manner as the mass portion of the second torsional damper moves, with respect to the rotational element, in the direction of the rotational axis of the rotational element and such that the elastic portion of the second torsional damper partially deforms in a compressed manner as the mass portion of the second torsional damper moves, with respect to the rotational element, in a direction other than the direction of the rotational axis of the rotational element, and
    at least one of the first torsional damper, the second torsional damper, and the rotational element has a first opposite face that is opposed to the first inclined face of the mass portion of the first torsional damper, and at least one of the first torsional damper, the second torsional damper, and the rotational element has second opposite faces that are opposed to the respective second inclined faces of the mass portion of the second torsional damper.

2. The damper device according to claim 1, wherein
    the first torsional damper and the second torsional damper are stacked in a radial direction of the rotational element such that the first torsional damper is provided on the inner side of the second torsional damper,
    the first inclined face is provided at an inner peripheral face of the mass portion of the first torsional damper and the second opposite faces are provided at an outer peripheral face of the mass portion of the first torsional damper so as to be opposed to the respective second inclined faces of the mass portion of the second torsional damper.

3. The damper device according to claim 1, wherein
    the first torsional damper and the second torsional damper are stacked in a radial direction of the rotational element such that the second torsional damper is provided on the inner side of the first torsional damper,
    the second inclined faces are provided at an inner peripheral face of the mass portion of the second torsional damper and the first opposite face is provided at an outer peripheral face of the mass portion of the second torsional damper so as to be opposed to the first inclined face of the mass portion of the first torsional damper.

4. The damper device according to claim 1, wherein
the first torsional damper and the second torsional damper are arranged in parallel so as to be adjacent to each other in the direction of the rotational axis of the rotational element, and
the first opposite face and the second opposite face are formed at the rotational element.

5. The damper device according to claim 1, wherein
the mass portion of the first torsional damper has a first convex portion protruding from the mass portion of the first torsional damper in a radial direction of the mass portion of the first torsional damper and extending along the circumference of the mass portion of the first torsional damper, and the first inclined face is formed by the first convex portion,
the mass portion of the second torsional damper has second convex portions spaced apart from each other along the circumference of the mass portion of the second torsional damper, protruding from the mass portion of the second torsional damper in a radial direction of the mass portion of the second torsional damper, and extending in the axial direction of the rotational element, and the second inclined faces are formed by the second convex portions,
the first opposite face is formed by a first opposite concave portion that is concaved so as to match the shape of the first convex portion, and
the second opposite faces are formed by second opposite concave portions that are concaved so as to match the shapes of the respective second convex portions.

6. The damper device according to claim 1, wherein
the mass portion of the first torsional damper has a first concave portion concaved in a radial direction of the mass portion of the first torsional damper and extending along the circumference of the mass portion of the first torsional damper, and the first inclined face is formed by the first concave portion,
the mass portion of the second torsional damper has second concave portions spaced apart from each other along the circumference of the mass portion of the second torsional damper, concaved in a radial direction of the mass portion of the second torsional damper, and extending in the axial direction of the rotational element, and the second inclined faces are formed by the second concave portions,
the first opposite face is formed by a first opposite convex portion that is convexed so as to match the shape of the first concave portion, and
the second opposite faces are formed by second opposite convex portions that are convexed so as to match the shapes of the respective second concave portions.

7. The damper device according to claim 1, further comprising:
a third torsional damper that has a mass portion and an elastic portion having a rubber elasticity and attached on the mass portion and that has a characteristic different from the characteristic of the first torsional damper and the characteristic of the second torsional damper, wherein
the mass portion of the third torsional damper has a first inclined face and a second inclined face that are formed such that the elastic portion of the third torsional damper partially deforms in a compressed manner both when the mass portion of the third torsional damper moves in a rotational direction about the rotational axis of the rotational element and when the mass portion of the third torsional damper moves in a direction other than the rotational direction.

8. The damper device according to claim 7, wherein
the elastic portion of the third torsional damper is larger in thickness than the elastic portion of the first torsional damper and the elastic portion of the second torsional damper.

9. The damper device according to claim 1, wherein
the first inclined face is composed of a pair of inclined faces, and each of the second inclined faces is composed of a pair of inclined faces.

10. The damper device according to claim 9, wherein
the inclined faces include flat faces.

11. The damper device according to claim 9, wherein
the inclined faces include curved faces.

12. A drive-force transfer unit, comprising:
the damper device according to claim 1;
a case;
a drive-side gear shaft that is rotatably supported by the case and inputs rotational drive force;
a driven-side gear shaft that is disposed in the case, is in mesh with the drive-side gear shaft, and rotates at a reduced speed;
an output shaft that is turned by the driven-side gear shaft; and
the rotational element that is provided at an end of an input shaft of the drive-side gear shaft.

13. The drive-force transfer unit according to claim 12, wherein
a resonance frequency of the first torsional damper is set to a value close to a torsional resonance frequency of the drive-side gear shaft, and
a resonance frequency of the second torsional damper is set to a value close to a bending resonance frequency of the drive-side gear shaft.

* * * * *